(12) United States Patent
Fujimoto

(10) Patent No.: US 8,520,340 B2
(45) Date of Patent: Aug. 27, 2013

(54) MAGNETIC HEAD SUSPENSION AND MANUFACTURING METHOD THEREOF

(75) Inventor: Yasuo Fujimoto, Kyoto-fu (JP)

(73) Assignee: Suncall Corporation, Kyoto-fu (JP)

( * ) Notice: Subject to any disclaimer, the term of this patent is extended or adjusted under 35 U.S.C. 154(b) by 0 days.

(21) Appl. No.: 13/592,556

(22) Filed: Aug. 23, 2012

(65) Prior Publication Data

US 2013/0077193 A1    Mar. 28, 2013

(30) Foreign Application Priority Data

Sep. 26, 2011 (JP) ................................. 2011-209141

(51) Int. Cl.
*G11B 5/48* (2006.01)
(52) U.S. Cl.
USPC ..................................................... 360/244.2
(58) Field of Classification Search
USPC ................. 360/244.2, 244.3, 244.5, 244.9
See application file for complete search history.

(56) References Cited

U.S. PATENT DOCUMENTS

| | | | | |
|---|---|---|---|---|
| 5,864,445 A * | 1/1999 | Bennin et al. | ............... | 360/245.9 |
| 6,043,956 A * | 3/2000 | Hanya et al. | ............... | 360/244.9 |
| 6,700,744 B2 * | 3/2004 | Nishida et al. | ............. | 360/244.2 |
| 6,798,618 B2 * | 9/2004 | Takagi et al. | ............... | 360/244.5 |
| 6,989,968 B2 * | 1/2006 | Takasugi et al. | ........... | 360/244.2 |
| 7,064,931 B2 * | 6/2006 | Hutchinson | ................ | 360/244.8 |
| 7,365,944 B2 * | 4/2008 | Fujimoto et al. | ........... | 360/244.2 |
| 7,573,679 B2 * | 8/2009 | Fujimoto | ................... | 360/244.2 |
| 8,085,505 B2 * | 12/2011 | Takasugi et al. | ........... | 360/244.2 |
| 8,233,244 B2 * | 7/2012 | Fujimoto | ................... | 360/294.4 |
| 8,385,022 B2 * | 2/2013 | Fujimoto | ................... | 360/244.2 |
| 2003/0231432 A1 * | 12/2003 | Bhattacharya et al. | ..... | 360/244.2 |
| 2011/0051290 A1 * | 3/2011 | Inoue et al. | ................ | 360/244.2 |

FOREIGN PATENT DOCUMENTS

JP    11-007740    1/1999

* cited by examiner

*Primary Examiner* — Angel Castro
(74) *Attorney, Agent, or Firm* — Sterne, Kessler, Goldstein & Fox P.L.L.C.

(57) ABSTRACT

A magnetic head suspension includes a supporting part, a load bending part, a load beam part and a flexure part, and is configured so that a condition of $L1 \leq 0.3*L$ and $0.6*L \leq L2$ is satisfied assuming that a length of the leaf spring in a suspension lengthwise direction that extends from a distal edge of the supporting part to a proximal end portion of the load beam part is represented by "L", a distance in the suspension lengthwise direction from the distal edge of the supporting part to the proximal side-bending line is represented by "L1" and a distance in the suspension lengthwise direction from the distal edge of the supporting part to the distal side-bending line is represented by "L2".

8 Claims, 12 Drawing Sheets

Distance "L2"(mm) by which distal side-bending line BL2 is away from distal edge of supporting part Distance "L2"(mm) by which distal side-bending line BL2
is away from distal edge of supporting part

MAGNETIC HEAD SUSPENSION AND MANUFACTURING METHOD THEREOF

BACKGROUND OF THE INVENTION

1. Field of the Invention

The present invention relates to a magnetic head suspension for supporting a magnetic head slider that reads and/or writes data from and to a recording medium such as a hard disk drive, and also relates to a manufacturing method thereof.

2. Related Art

A magnetic head suspension that supports a magnetic head slider is required to have the magnetic head slider rapidly and accurately moved to a center of a target track.

More specifically, the magnetic head suspension has a proximal side that is directly or indirectly connected to an actuator such as a voice coil motor and a distal side that supports the magnetic head slider, and is swung around a swing center by the actuator so as to move the magnetic head slider along a seek direction parallel to a disk surface until the center of the target track.

In order to have the magnetic head slider rapidly and accurately moved to the target track, the magnetic head suspension has to be configured so as to be capable of reducing a vibration of the magnetic head slider as much as possible even in a case that a frequency of a drive signal that drives the actuator is raised.

By the way, vibrations in various modes are generated in the magnetic head suspension when it is swung by the actuator. The vibrations deteriorate a positioning accuracy of the magnetic head slider with respect to the target track.

Out of the various vibration modes possibly generated in the magnetic head suspension, the first torsion mode, the second torsion, the third torsion mode and the sway mode (oscillation mode) have resonance frequencies within a relatively low frequency range. It is therefore required to prevent or reduce a displacement of the magnetic head slider due to the vibrations of these vibration modes.

Displacement amounts (gains) of the magnetic head slider from the target track due to the vibrations in the first to third torsion modes can be minimized by adjusting a bending angle at a bending portion, which is provided at an intermediate region of a load beam part, and/or adjusting a position of the bending portion at the load beam part in a suspension lengthwise direction, and also adjusting a position of a bending portion, which is provided at a load bending part of the magnetic head suspension, in the suspension lengthwise direction.

That is, an adjustment of the bending angle at the bending portion at the load beam part and/or an adjustment of the position thereof in the suspension lengthwise direction to respective optimum values as well as an adjustment of the position of the bending portion at the load bending part in the suspension lengthwise direction to an optimum value make it possible to minimize the displacement amount of the magnetic head slider from the target track due to the vibrations in the first to third torsion modes even if the vibration in any of the first to third modes is generated in the magnetic head suspension.

For example, Japanese Unexamined Patent Publication No. 11-007740 discloses a magnetic head suspension including a load bending part with two bending portions at which bending angles are same as each other in order to reduce a gain of the magnetic head slider at the time when a resonant vibration is generated in the suspension.

On the other hand, a displacement amount (gain) of the magnetic head slider from the target track due to the vibration in the sway mode cannot be minimized by adjusting the bending angle at the bending portion at the load beam part and/or adjusting the position thereof in the suspension lengthwise direction, and also adjusting the position of the bending portion at the load bending part in the suspension lengthwise direction.

Accordingly, in order to prevent or reduce the displacement of the magnetic head slider from the target track due to the vibration in the sway mode, it is needed that the vibration in the sway mode is not likely to be generated in the magnetic head suspension. That is, it is needed to raise a resonant frequency of the magnetic head suspension in the sway mode as much as possible so as to prevent the resonant vibration in the sway mode from being generated therein as much as possible even if the frequency of the drive signal is raised in order to rapidly move the magnetic head slider to the target track.

As a typical method for raising the resonant frequency in the sway mode, it is conceivable to widen a proximal side of the load beam part so as to enhance rigidity of the magnetic head suspension with respect to a suspension width direction.

However, the magnetic head suspension needs the load bending part that has low rigidity so as to generate a load for pressing the magnetic head slider toward the disk surface. Accordingly, even if the load beam part is configured so as to have high rigidity with respect to the suspension width direction, rigidity of the magnetic head suspension as a whole with respect to the suspension width direction cannot be raised so much.

SUMMARY OF THE INVENTION

The present invention is made in view of the conventional techniques and aims to provide a magnetic head suspension in which a load beam part and a load bending part are provided with respective bending portions in order to reduce a gain of a magnetic head slider at the time when the suspension vibrates in the torsion mode, wherein it is capable of effectively raising a resonant frequency in the sway mode.

The present invention also aims to provide a manufacturing method capable of efficiently manufacturing the magnetic head suspension.

In order to achieve the aim, the present invention provides a magnetic head suspension including a supporting part that is swung around a swing center in a seek direction parallel to a disk surface directly or indirectly by an actuator, a load bending part including a leaf spring that has a proximal end portion connected to the supporting part and generates a pressing load for pressing a magnetic head slider toward the disk surface, a load beam part that is supported through the leaf spring by the supporting part and transmits the pressing load to the magnetic head slider, and a flexure part that is fixed to the load beam part and the supporting part while supporting the magnetic head slider, wherein the load beam part is bent around a load beam part-bending line that is along a suspension width direction, wherein the leaf spring is bent around a proximal side-bending line and a distal side-bending line that is positioned on a distal side of the proximal side-bending line so that the pressing load is defined by the sum of a load generated by a proximal side-bending portion at the proximal side-bending line and a load generated by a distal side-bending portion at the distal side-bending line, and wherein assuming that a length of the leaf spring in a suspension lengthwise direction that extends from a distal edge of the supporting part to a proximal end portion of the load beam part is represented by "L", a distance in the suspension lengthwise direction from the distal edge of the supporting part to the proximal side-bending line is represented by "L1" and a distance in the suspension lengthwise direction from the distal edge of the supporting part to the distal side-bending line is represented by "L2", a condition of L1≦0.3*L and 0.6*L≦L2 is satisfied.

In the magnetic head suspension according to the present invention, the load beam part is bent at the load beam part-bending line, and the leaf spring forming the load bending part is bent at the proximal side-bending line and also at the distal side-bending line that is positioned on the distal side of the proximal side-bending line so that the pressing load is defined by the sum of the load generated by the proximal side-bending portion at the proximal side-bending line and the distal side-bending portion at the distal side-bending line. Accordingly, it is possible to set the pressing load by adjusting a bending angle of one of the proximal side-bending portion and the distal side-bending portion, and also utilize, as parameters for shifting or displacing torsion center lines in the first to third torsion modes, positions of the respective bending lines, an bending angle of a load beam part-bending portion at the load beam part-bending line, and a bending angle of the other one of the proximal side-bending portion and the distal side-bending portion that is not used for setting the pressing load, thereby effectively reducing a gain of the magnetic head slider at the time when the suspension vibrates in the torsion mode. Therefore, a displacement of the magnetic head slider from a target track due to the vibration in the torsion mode can be effectively prevented.

Furthermore, the magnetic head suspension is configured so that a condition of L1≦0.3*L and 0.6*L≦L2 is satisfied assuming that the length of the leaf spring in a suspension lengthwise direction that extends from the distal edge of the supporting part to the proximal end portion of the load beam part is represented by "L", the distance in the suspension lengthwise direction from the distal edge of the supporting part to the proximal side-bending line is represented by "L1" and the distance in the suspension lengthwise direction from the distal edge of the supporting part to the distal side-bending line is represented by "L2". The thus configured magnetic head suspension can raise a resonant frequency in the sway mode without decreasing a resonant frequency in the sway mode. Accordingly, the vibration in the sway mode can be effectively prevented so that the displacement of the magnetic head slider from the target track due to the vibration in the sway mode can be effectively prevented.

In a preferable configuration, the magnetic head suspension is configured so that a condition of L1≦0.15*L is satisfied.

In a preferable configuration, both the proximal side-bending portion and the distal side-bending portion are formed into a shape that is convex toward a direction opposite from the disk surface so that a distal side of the suspension comes closer to the disk surface, and the bending angle "θ2" of the distal side-bending portion is greater than the bending angle "θ1" of the proximal side-bending portion.

In one embodiment, the leaf spring may include paired first and second leaf spring portions that are arranged on both sides in the suspension width direction while having a space at a center in the suspension width direction and are symmetrical to each other in a plan view with the suspension lengthwise center line as a reference.

In this case, the proximal side-bending line includes a first proximal side-bending line provided at the first leaf spring portion so as to be along the suspension width direction, and a second proximal side-bending line provided at the second leaf spring portion so as to be symmetrical to the first proximal side-bending line in a plan view with the suspension lengthwise center line as a reference. The distal side-bending line preferably may include a first distal side-bending line provided at the first leaf spring portion so as to be inclined with respect to the suspension width direction, and a second distal side-bending line provided at the second leaf spring portion so as to be symmetrical to the first distal side-bending line in a plan view with the suspension lengthwise center line as a reference.

In the one embodiment, the first and second distal side-bending lines may be preferably inclined so as to be positioned on the distal side in the suspension longitudinal direction as going from an inner side to an outer side in the suspension width direction.

In another embodiment, the leaf spring may be formed by a single plate-like member that extends from the distal edge of the supporting part to the proximal end portion of the load beam part over a whole region in the suspension width direction.

In this case, the flexure part includes a flexure base plate that is brought into contact with disk-facing surfaces of the load beam part and the supporting part that face the disk surface and is fixed thereto.

The flexure base plate includes a supporting part fixed region that is fixed to the disk-facing surface of the supporting part, a load beam part fixed region that is fixed to the disk-facing surface of the load beam part, and a load bending part corresponding region that extends between supporting part fixed region and the load beam part fixed region while being overlapped with the leaf spring.

The leaf spring is provided with an opening at a region with which the load bending part corresponding region is overlapped and on which the proximal side-bending line is positioned, and another opening at a region with which the load bending part corresponding region is overlapped and on which the distal side-bending line is positioned.

In any one of the above-mentioned configurations, the load beam part may include a plate-like main body portion that faces the disk surface, and paired right and left flange portions that extend from both sides of the main body portion in a suspension width direction toward a direction opposite from the disk surface.

Both the sides of the main body portion in the suspension width direction may be preferably inclined in a substantially linear manner so as to come closer to a suspension lengthwise center line as they go from proximal ends toward distal ends in the suspension lengthwise direction.

Furthermore, the present invention provides a manufacturing method of the magnetic head suspension according to any one of the above-mentioned configurations, including a distal side-bending step in which a region of the leaf spring that is positioned on a proximal side of a position, which corresponds to the distal side-bending line, is sandwiched to function as a distal side-standard region, and, in this state, a region of the leaf spring that is positioned on a distal side of the position corresponding to the distal side-bending line is then bent with respect to the distal side-standard region by a predetermined angle to form the distal side-bending portion, and a proximal side-bending step in which a region of the leaf spring that is positioned on a proximal side of a position, which corresponds to the proximal side-bending line, is sandwiched to function as a proximal side-standard region, and, in this state, a region of the leaf spring that is positioned on a distal side of the position corresponding to the proximal side-bending line while being positioned on a proximal side of the distal side-bending line is then bent with respect to the proximal side-standard region by a predetermined angle to form the proximal side-bending portion.

DETAILED DESCRIPTION OF THE PREFERRED EMBODIMENTS

First Embodiment

Hereinafter, one preferred embodiment of a magnetic head suspension according to the present invention will be described, with reference to the attached drawings.

Figure 1:
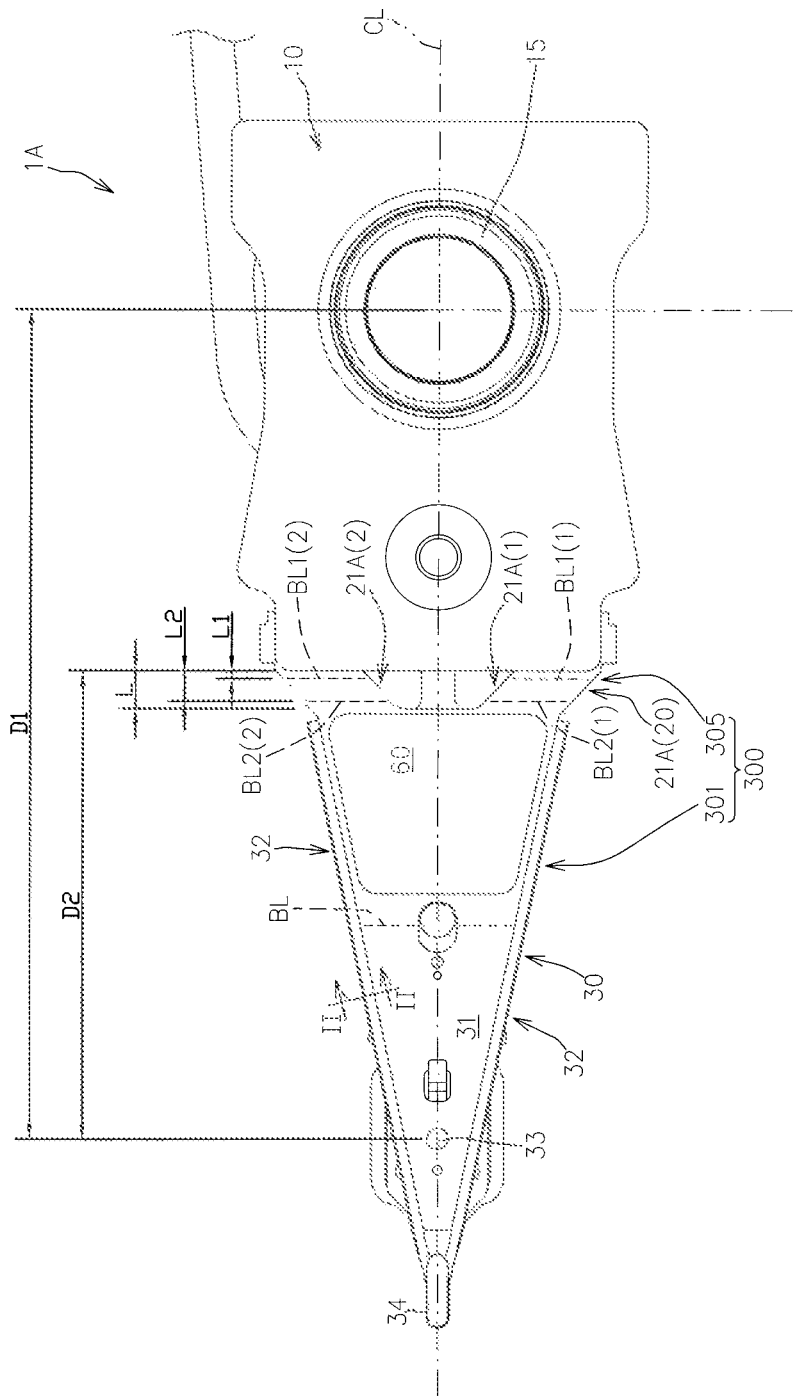
FIG. 1 is a top view of a magnetic head suspension according to a first embodiment of the present invention.
Figure 2:
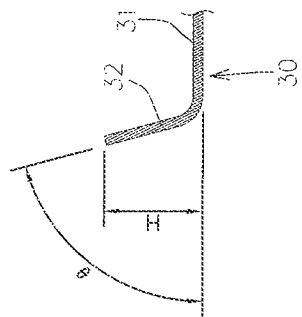
FIG. 2 is a cross sectional view taken along line II-II in FIG. 1.

FIG. 1 is a top view (a plan view illustrated from a side opposite from a disk surface) of a magnetic head suspension 1A according to the present embodiment, and FIG. 2 is a cross sectional view taken along line II-II in FIG. 1.

Figure 3:
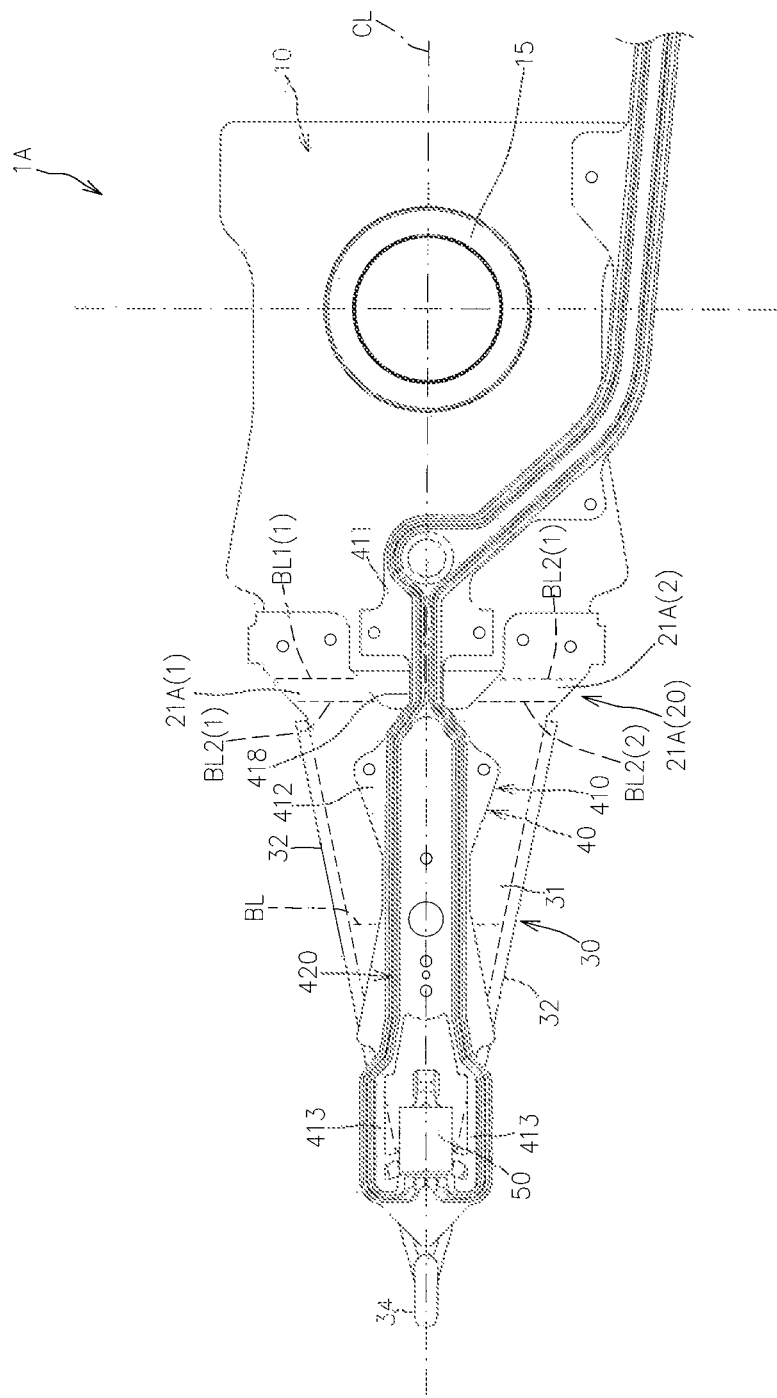
FIG. 3 is a bottom view of the magnetic head suspension according to the first embodiment.
Figure 4:
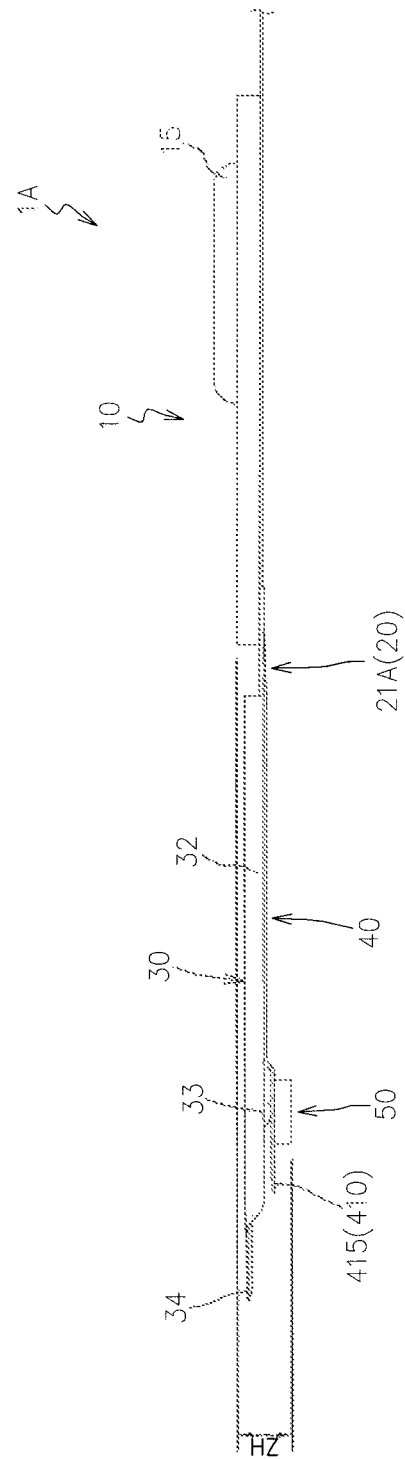
FIG. 4 is a side view of the magnetic head suspension according to the first embodiment.

Further, FIGS. 3 and 4 are a bottom view (a bottom plan view illustrated from a side facing the disk surface) and a side view of the magnetic head suspension 1A, respectively. FIG. 3 shows welding points with small circles.

As shown in FIGS. 1 to 4, the magnetic head suspension 1A includes a supporting part 10, a load bending part 20, a load beam part 30 and a flexure part 40. The supporting part 10 is swung around a swing center in a seek direction parallel to the disk surface directly or indirectly by an actuator (not shown) such as a voice coil motor. The load bending part 20 includes a leaf spring 21A that has a proximal end portion connected to the supporting part 10 so as to generate a load for pressing a magnetic head slider 50 toward the disk surface. The load beam part 30 is supported through the leaf spring 21A by the supporting part 10 and transmits the load to the magnetic head slider 50. The flexure part 40 is supported by the load beam part 30 and the supporting part 10 while supporting the magnetic head slider 50.

The supporting part 10 is a member for supporting the load beam part 30 through the leaf spring 21A while being directly or indirectly connected to the actuator, and is therefore made to have relatively high rigidity.

In the present embodiment, as shown in FIGS. 1, 3 and 4, the supporting part 10 is formed as a base plate including a boss portion 15 to which a distal end of a carriage arm (not shown) is joined by swage processing, the carriage arm being connected to the actuator.

The supporting part 10 may be preferably made from, for example, a stainless steel plate having a thickness of 0.1 mm to 0.8 mm.

It is of course possible to adopt as the supporting part 10 an arm having a proximal end that is connected to the swing center of the actuator.

As described above, the load beam part 30 is a member for transmitting the load generated by the leaf spring 21A to the magnetic head slider 50, and therefore is required to have predetermined rigidity.

As shown in FIGS. 1 to 3, the load beam part 30 has a plate-like main body portion 31 that faces the disk surface, and paired right and left flange portions 32 that extend from both side edges of the main body portion 31 in a suspension width direction toward a direction opposite from the disk surface, and enhance rigidity by the flange portions 32.

The load beam part 30 may be preferably made from, for example, a stainless steel plate having a thickness of 0.02 mm to 0.1 mm.

As shown in FIGS. 1 and 3, the main body portion 31 is formed at its distal end section with a protrusion 33 that is a so-called dimple.

The protrusion 33 is protruded by, for example, about 0.05 mm to 0.1 mm in a direction toward the disk surface. The protrusion 33 is brought into contact with an upper surface (a surface opposite from the disk surface) of a head-mounting region 415 of the flexure part 40, which is explained later, so that the load is transmitted to the head-mounting region 415 of the flexure part 40 through the protrusion 33.

In the present embodiment, as shown in FIGS. 1 to 3, the load beam part 30 further integrally includes a lift tab 34 that extends from a distal end of the main body portion 31 toward the distal side in a suspension lengthwise direction. The lift tab 34 is a member that engages with a lamp provided in a hard disk drive so as to cause the magnetic head slider 50 to move away from the disk surface in the z direction (a direction perpendicular to the disk surface) at the time when the magnetic head suspension 1A is swung by the actuator so that the magnetic head slider 50 is positioned outward from the disk surface in a radial direction.

In the present embodiment, as shown in FIGS. 1 and 3, the main body portion 31 of the load beam part 30 has both sides in the suspension width direction that substantially form lines inclined in such a manner as to come closer to a suspension lengthwise center line CL as they go from proximal ends toward distal ends in the suspension lengthwise direction.

The configuration makes it possible to reduce a moment of inertia of the distal side of the load beam part 30 around the center line CL, thereby realizing rises in resonant frequencies in the torsion mode and the sway mode.

As shown in FIGS. 1 and 3, in the present embodiment, the load beam part 30 is provided with a load beam part-bending portion that is bent around a load beam part-bending line BL along the suspension width direction.

The load beam part-bending portion is bent in a direction defined by a desired performance or specification, that is, either one of a first direction in which the distal end of the load beam part moves away from the disk surface and a second direction in which the distal end comes closer to the disk surface.

The leaf spring 21A has a proximal end portion connected to a distal side of the supporting part 10 and a distal end connected to a proximal side of the load beam part 30 while a plate surface thereof facing the disk surface.

The leaf spring 21A is provided with a bending portion, and takes an initial posture in which the bending portion has no retained elasticity when the magnetic head suspension 1A is at a free condition before it is assembled into a hard disk drive.

On the other hand, when the magnetic head suspension 1A is assembled into the hard disk drive, the bending portion is elastically deformed in a bending-back direction, which is opposite from a direction in which the bending portion has been bent, so that the magnetic head slider 50 is positioned onto the disk surface of the hard disk drive.

Further, when the hard disk drive is shifted in an operating condition to rotate the disk surface, the magnetic head slider 50 receives an air pressure caused by the rotation of the disk surface to float in a direction opposite from the disk surface. The floating motion of the magnetic head slider 50 causes the bending portion to be further elastically deformed.

More specifically, the leaf spring is changed to a condition that has a retained elasticity generated by the elastic deformation at the time when the magnetic head suspension is assembled into the hard disk drive as well as the elastic deformation at the time when the magnetic head slider floats in response to the rotation of the disk surface, the retained elasticity functioning as the load for pressing the magnetic head slider 50 toward the disk surface.

In the present embodiment, as shown in FIGS. 1 and 3, the leaf spring 21A includes a proximal side-bending portion that is bent around a proximal side-bending line BL1 and a distal side-bending portion that is bent around a distal side-bending line BL2 positioned on a distal side in the suspension lengthwise direction from the proximal side-bending line BL1, as the bending portion.

For example, both the proximal side- and distal side-bending portions are bent in a direction that causes the distal side to come closer to the disk surface.

In the leaf spring 21A including the proximal side-bending portion and the distal side-bending portion, both the proximal side-bending portion and the distal side-bending portion are elastically deformed in the bending-back direction at the time when the magnetic head suspension is assembled into the hard disk drive and both the bending portions are also elastically deformed at the time when the magnetic head slider 50 floats in response to the rotation of the disk surface so that both the bending portions has the retained elasticity. In this case, the pressing load is defined by a sum of a load generated by the proximal side-bending portion and a load generated by the distal side-bending portion.

Therefore, the pressing load can be adjusted to a desired value by adjusting the bending angle of either one of the proximal side-bending portion and the distal side-bending portion.

As in the present embodiment, in a case where the load beam part 30 has the load beam part-bending portion that is bent around the load beam part-bending line BL and the leaf spring 21A also has the proximal side-bending portion and the distal side-bending portion that are bent around the proximal side-bending line BL1 and the distal side-bending line BL2, respectively, adjustments of the positions of the bending lines in the suspension lengthwise direction as well as adjustments of the bending angles of the bending portions make it possible to reduce a displacement amount (gain) of the magnetic head slider 50 from the target track of the disk surface at the time when the magnetic head suspension 1A vibrates in the torsion mode.

More specifically, in a case where the frequency of a drive signal for the actuator is raised in order to quickly move the magnetic head slider onto the target track, a resonant vibration in the first torsion mode is generated in the magnetic head suspension when the frequency of the drive signal reaches a certain frequency (hereinafter, referred to as a first resonant frequency).

In the resonant vibration in the first torsion mode, in a state where a position of a distal edge of the supporting part 10 and a position of the dimple 33 of the load beam part 30 are fixed so as not to be displaced in the z direction perpendicular to the disk surface (namely, the two positions form nodes), only the load beam part 30 is twisted about a first torsion center line along the suspension lengthwise center line CL so that a substantially center portion of the suspension between the two nodes in the suspension lengthwise direction has a maximum displacement amount in the z direction (namely, the substantially center portion forms an antinode).

In a case where the frequency of the drive signal is further raised beyond the first resonant frequency, upon reaching another certain frequency (hereinafter, referred to as a second resonant frequency), a resonant vibration in the second torsion mode is generated in the magnetic head suspension 1A.

In the resonant vibration in the second torsion mode, in a state where three positions form the nodes, the three positions including a position of an area of the supporting part 10 that is rigidly fixed with respect to the z direction (in a case where the supporting part 10 is embodied by the base plate, a position of the boss portion 15 that is fixed by caulking to the carriage arm coupled to the actuator; hereinafter, referred to as a supporting part fixed position), the position of the dimple 33, and a halfway position of the load beam part 30 that is located at a substantially center in the suspension longitudinal direction between the supporting part fixed position and the position of the dimple, a first region between the supporting part fixed position and the halfway position of the load beam part 30 is twisted in a first direction about a second torsion center line along the suspension lengthwise center line CL while a second region between the halfway position and the dimple 33 is twisted in a second direction that is opposite from the first direction about the second torsion center line so that two portions form the antinode, the two portions including a substantially center portion of the first region in the suspension longitudinal direction and a substantially center portion of the second region in the suspension longitudinal direction.

In a case where the frequency of the drive signal is furthermore raised beyond the second resonant frequency, upon reaching still another certain frequency (hereinafter, referred to as a third resonant frequency), a resonant vibration in the third torsion mode is generated in the magnetic head suspension 1A.

In the resonant vibration in the third torsion mode, in a state where four positions form the nodes, the four positions including the supporting part fixed position, the position of the load bending part 20, the position of the dimple 33 and the halfway position of the load beam part 30 that is located at a substantially center in the suspension longitudinal direction between the position of the load bending part 20 and the position of the dimple 33, a first region between the supporting part fixed position and the position of the load bending part 20 is twisted in a first direction about a third torsion center line along the suspension lengthwise center line, a second region between the position of the load bending part 20 and the halfway position of the load beam part 30 is twisted in a second direction that is opposite from the first direction about the third torsion center line, and a third region between the halfway position of the load beam part 30 and the position of the dimple 33 is twisted in the first direction about the third torsion center line.

Even if the vibration in any one of the first to third torsion modes is generated in the suspension 1A, it is possible to reduce the gain of the magnetic head slider 50 due to the vibration of the magnetic head suspension 1A in the first to third torsion modes by making the first torsion center line, the second torsion center line and the third torsion center line come closer to an apex of the dimple 33 as much as possible.

The first torsion center line, the second torsion center line and the third torsion center line can be shifted by adjusting the positions of the bending lines BL, BL1, BL2 and the bending angles of the bending portions.

More specifically, the adjustment of the bending angle of one of the proximal side-bending portion and the distal side-bending portion is utilized for setting the pressing load to a desired value.

Accordingly, the position of the load beam part-bending line BL, the bending angle of the load beam part-bending portion, the positions of the proximal side-bending line BL1 and the distal side-bending line BL2, and the bending angle of the other one of the proximal side-bending portion and the distal side-bending portion can be utilized as parameters for shifting the first torsion center line, the second torsion center line and the third torsion center line.

That is, even if the vibration in any one of the first to third torsion modes is generated, it is possible to prevent the magnetic head slider 50 from being displaced from the target track as much as possible by setting the parameters so that all of the three center lines come closer to the apex of the dimple 33.

In the present embodiment, as shown in FIGS. 1 and 3, the leaf spring 21A includes paired first and second leaf spring portions 21A(1), 21A(2) that are arranged on both sides in the suspension width direction while having a space between them in the suspension width direction and are symmetrical to each other in a plan view with the suspension lengthwise center line CL as a reference.

In the configuration, the proximal side-bending line BL1 includes a first proximal side-bending line BL1(1) provided in the first leaf spring portion 21A(1) and a second proximal side-bending line BL1(2) provided in the second leaf spring portion 21A(2), wherein the first and second proximal side-bending lines BL1(1), BL1(2) are symmetrical to each other in a plan view with the suspension lengthwise center line CL as a reference.

Similarly, the distal side-bending line BL2 includes a first distal side-bending line BL2(1) provided in the first leaf spring portion 21A(1) and a second distal side-bending line BL2(2) provided in the second leaf spring portion 21A(2), wherein the first and second distal side-bending lines BL2(1), BL2(2) are symmetrical to each other in a plan view with the suspension lengthwise center line CL as a reference.

The leaf spring 21A is made by, for example, a stainless steel plate having a thickness of 0.02 mm to 0.1 mm.

In the present embodiment, the leaf spring 21A is integrally formed with the load beam part 30 by a load beam part-forming member 300.

More specifically, in the present embodiment, as shown in FIGS. 1 and 3, the load beam part-forming member 300 integrally includes a load beam part-forming region 301 that forms the load beam part 30 and a leaf spring-forming region 305 that extends toward the distal side in the suspension longitudinal direction from load beam part-forming region 301, wherein the leaf spring-forming region 305 is formed with the space at the center in the suspension width direction to form the paired first and second leaf spring portions 21A(1), 21A(2).

The flexure part 40 is fixed by welding or the like to the load beam part 30 and the supporting part 10 while supporting the magnetic head slider 50.

More specifically, the flexure part 40 includes a flexure base plate 410.

As shown in FIG. 3, the flexure base plate 410 includes a supporting part fixed region 411 fixed by welding or the like to the supporting part 10, a load beam part fixed region 412 fixed by welding or the like to the load beam part 30, a load bending part corresponding region 418 extending between supporting part fixed region 411 and the load beam part fixed region 412 so as to pass over the load bending part 20 in the suspension longitudinal direction, paired supporting pieces 413 extending toward the distal side in the suspension longitudinal direction from both sides, in the suspension width direction, of the distal portion of the load beam part fixed region 412, and the head-mounting region 415 supported by the supporting pieces 413.

As shown in FIG. 4, the head-mounting region 415 supports the magnetic head slider 50 at a lower surface that faces the disk surface.

As explained earlier, the protrusion 33 is brought into contact with an upper surface of the head-mounting region 415, so that the head-mounting region 415 could sway flexibly in a roll direction as well as in a pitch direction, with the protrusion 33 functioning as a fulcrum.

The flexure base plate 410 has rigidity lower than that of the load beam part 30, so that the head-mounting region 415 could sway in the roll direction as well as in the pitch direction.

The flexure base plate 410 may be preferably made from a metal plate such as a stainless steel plate having a thickness of 0.01 mm to 0.025 mm.

In a preferable configuration, the flexure part 40 is integrally provided with a wiring structure 420 for electrically connecting the magnetic head slider 50 to an outside member, as shown in FIG. 3.

More specifically, the wiring structure 420 may include an insulating layer laminated on the lower surface of the flexure base plate 410 that faces the disk surface, and a signal wiring laminated on a surface of the insulating layer that faces the disk surface.

Preferably, the wiring structure 420 may include an insulative cover layer enclosing the signal wiring.

As shown in FIG. 1, the magnetic head suspension 1A according to the present embodiment further includes a damper 60 fixed to the upper surface, which is opposite from the disk surface, of the main body portion 31 of the load beam part 30.

The damper 60 may include a first layer fixed to the upper surface of the main body portion 31 that is opposite from the disk surface and is made from a viscoelastic material, and a second layer fixed to an upper surface of the first layer that is opposite from the disk surface.

The first layer may be preferably formed by, for example, acrylic polymer and silicon.

The second layer may be preferably formed by, for example, metal material such as stainless steel and aluminum, or plastic material such as polyethylene terephthalate.

As explained earlier, the magnetic head suspension 1A according to the present embodiment can reduce the gain of magnetic head slider 50 at the time when the suspension vibrates in any one of the first to third torsion modes by adjusting the parameters including the position of the load beam part-bending line BL, the bending angle of the load beam part-bending portion, the position of the proximal side-bending line BL1, the position of the distal side-bending line BL2, and the bending angle of any one of the proximal side-bending portion and the distal side-bending portion. However, it is not possible to reduce the gain of the magnetic head slider 50 at the time when the suspension vibrates in the sway mode by adjusting the parameters.

Accordingly, in order to prevent as much as possible a displacement of the magnetic head slider 50 from the target track due to the vibration in the sway mode, the magnetic head suspension 1A has to be configured so that the vibration in the sway mode is less likely to be generated.

In regard to this point, the inventor of the present application made a hypothesis that the positions of the proximal side-bending line BL1 and the distal side-bending line BL2 have some kind of relationship with the resonant frequency in the sway mode, and performed the following analysis on the basis of the finite element method for ascertaining whether the hypothesis is true.

A magnetic head suspension used in this analysis has the following key dimensions.

The load beam part 30 is made from a stainless steel plate having a thickness of 0.025 mm, a height "H" (see FIG. 2) and an angel "θ" (see FIG. 2) are set to 0.275 mm and 70 degrees, respectively.

A distance "D1" (see FIG. 1) between a center of the boss portion 15 of the supporting part 10 and the dimple 33 in the suspension longitudinal direction is set to 11 mm, a distance "D2" (see FIG. 1) between the distal edge of the supporting part 10 and the dimple 33 in the suspension longitudinal direction is set to 6.2 mm, and a length "L" (see FIG. 1) of the leaf spring 21A in the suspension longitudinal direction is set to 0.664 mm (=0.11*D2).

With the magnetic head suspension having the key dimensions, a relationship of a distance "L1" (see FIG. 1) between the distal edge of the supporting part 10 and the proximal side-bending line BL1 in the suspension longitudinal direction and a distance "L2" (see FIG. 1) between the distal edge of the supporting part 10 and the distal side-bending line BL2 in the suspension longitudinal direction with respect to the resonant frequencies in the torsion mode and the sway mode was analyzed on the basis of the finite element method.

Now, a first analysis will be explained, which relates to the position of the proximal side-bending line BL1.

For the first analysis, prepared were plural magnetic head suspensions 1a to 1e in which the "L1" was set to 0 (zero), 0.15*L (=0.1 mm), 0.30*L (=0.2 mm), 0.45*L (=0.3 mm) and 0.60*L (=0.4 mm), respectively, while the "L2" is fixed to 0.60*L 0.40 mm).

Both the proximal side-bending portion at the proximal side-bending line BL1 and the distal side-bending portion at the distal side-bending line BL2 were bent in such a direction as to cause the distal side of the suspension to come closer the disk surface.

A condition of L1=0 (the magnetic head suspension 1a) means that the proximal side-bending line BL1 is arranged at the same position as the distal edge of the supporting part 10. A condition of L1=0.60*L that is equal to L2 means that the proximal side-bending line BL1 is arranged at the same position as the distal side-bending line BL2, that is, only one bending line is arranged at the position that is away from the distal edge of the supporting part 10 by 0.60*L.

In each of the magnetic head suspensions 1a to 1e, the bending angel "θ1" of the proximal side-bending portion was adjusted so that the pressing load defined by the sum of the load generated by the distal side-bending portion and the load generated by the proximal side-bending portion was 2.5 gf in a state where the bending angle "θ2" of the distal side-bending portion was fixed to 5 degrees and a distance "ZH" (see FIG. 2, the distance "ZH" means a height under condition that the suspension is assembled into a hard disk drive, and is hereinafter referred to as "setting height") between the lower surface (the disk-facing surface) of the magnetic head slider 50 and the upper surface of the supporting part fixed position in the z direction orthogonal to the disk surface was 0.57 mm.

In each of the magnetic head suspensions 1a to 1e, obtained were the resonant frequencies in the first torsion mode, the second torsion mode, and the sway mode on the basis of the finite element method.

Figure 5:
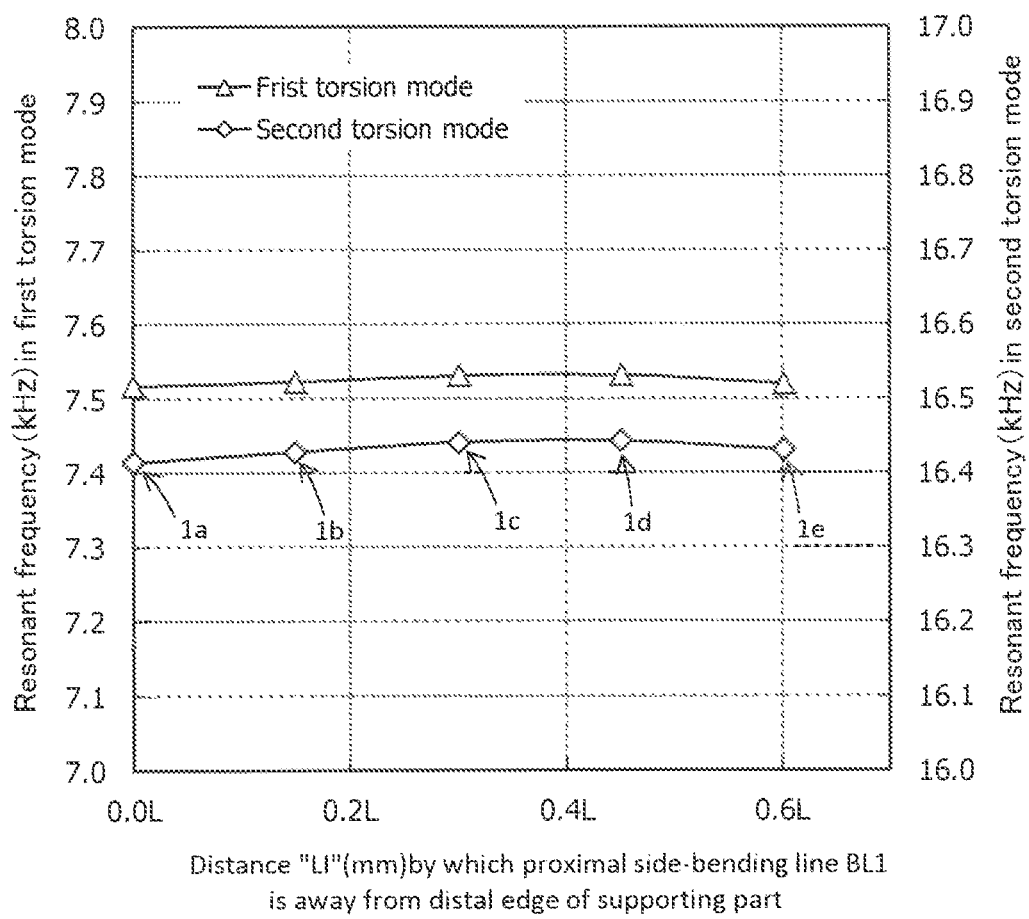
FIG. 5 is a graph showing a result of an analysis regarding a relationship between a position of a proximal side-bending line and resonant frequencies in the first and second torsion modes.
Figure 6:
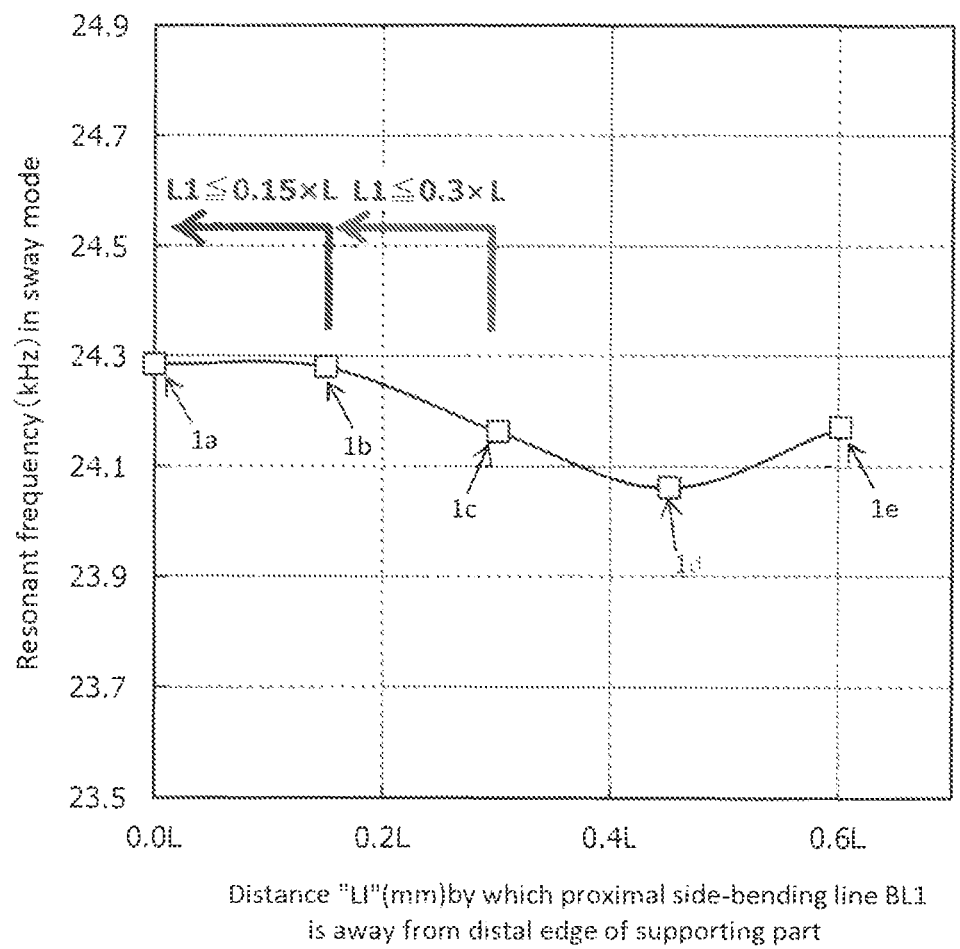
FIG. 6 is a graph showing a result of an analysis regarding a relationship between the position of the proximal side-bending line and a resonant frequency in the sway mode.

FIGS. 5 and 6 show the result.

It can be confirmed from FIG. 5 that there is no significant change in the resonant frequencies in the first and second torsion modes even if the position of the proximal side-bending line BL1 is changed.

On the other hand, assuming that the resonant frequency in the configuration in which the proximal side-bending line BL1 is arranged at the same position as the distal side-bending line BL2 (that is, only one bending line is provided at the leaf spring 21A (the magnetic head suspension 1e)) is a standard frequency, the resonant frequency in the sway mode is reduced from the standard frequency as the proximal side-bending line BL1 is shifted toward the proximal side in the suspension longitudinal direction and has a minimum value in the vicinity of L1=0.45*L, as shown in FIG. 6.

As the proximal side-bending line BL1 is further shifted toward the proximal side in the suspension longitudinal direction from the position at which the resonant frequency in the sway mode has the minimum value, the resonant frequency in the sway mode is increased and substantially corresponds to the standard frequency in the vicinity of L1=0.3*L, and then reaches to a maximum value in the vicinity of L1=0.15*L.

What is found from the fact is that the arrangement of the proximal side-bending line BL1 so that the condition of L1≦0.3*L, preferably the condition of L1≦0.3*L, is satisfied makes it possible to increase the resonant frequency in the sway mode without decreasing the resonant frequencies in the first and second torsion modes.

Next, a second analysis will be explained, which relates to the position of the distal side-bending line BL2.

For the second analysis, prepared were plural magnetic head suspensions 1f to 1k in which the "L2" was set to 0.15*L (=0.1 mm), 0.45*L (=0.3 mm), 0.60*L (=0.4 mm), 0.75*L (=0.5 mm), 0.85*L (=0.56 mm) and 0.96*L (=0.64 mm), respectively, while the "L1" is fixed to 0.15*L (=0.10 mm).

Both the proximal side-bending portion at the proximal side-bending line BL1 and the distal side-bending portion at the distal side-bending line BL2 were bent in such a direction as to cause the distal side of the suspension to come closer the disk surface.

A condition of L2=0.15*L that is equal to L1 means that the distal side-bending line BL2 is arranged at the same position as the proximal side-bending line BL1, that is, only one bending line is arranged at the position that is away from the distal edge of the supporting part 10 by 0.15*L.

In each of the magnetic head suspensions 1f to 1k, the bending angel "θ1" of the proximal side-bending portion was adjusted so that the pressing load defined by the sum of the load generated by the distal side-bending portion and the load generated by the proximal side-bending portion was 2.5 gf in a state where the bending angle "θ2" of the distal side-bending portion was fixed to 5 degrees and the setting distance "ZH" (see FIG. 2) of the magnetic head slider 50 was 0.57 mm.

In each of the magnetic head suspensions 1f to 1k, obtained were the resonant frequencies in the first torsion mode, the second torsion mode, and the sway mode on the basis of the finite element method.

Figure 7:
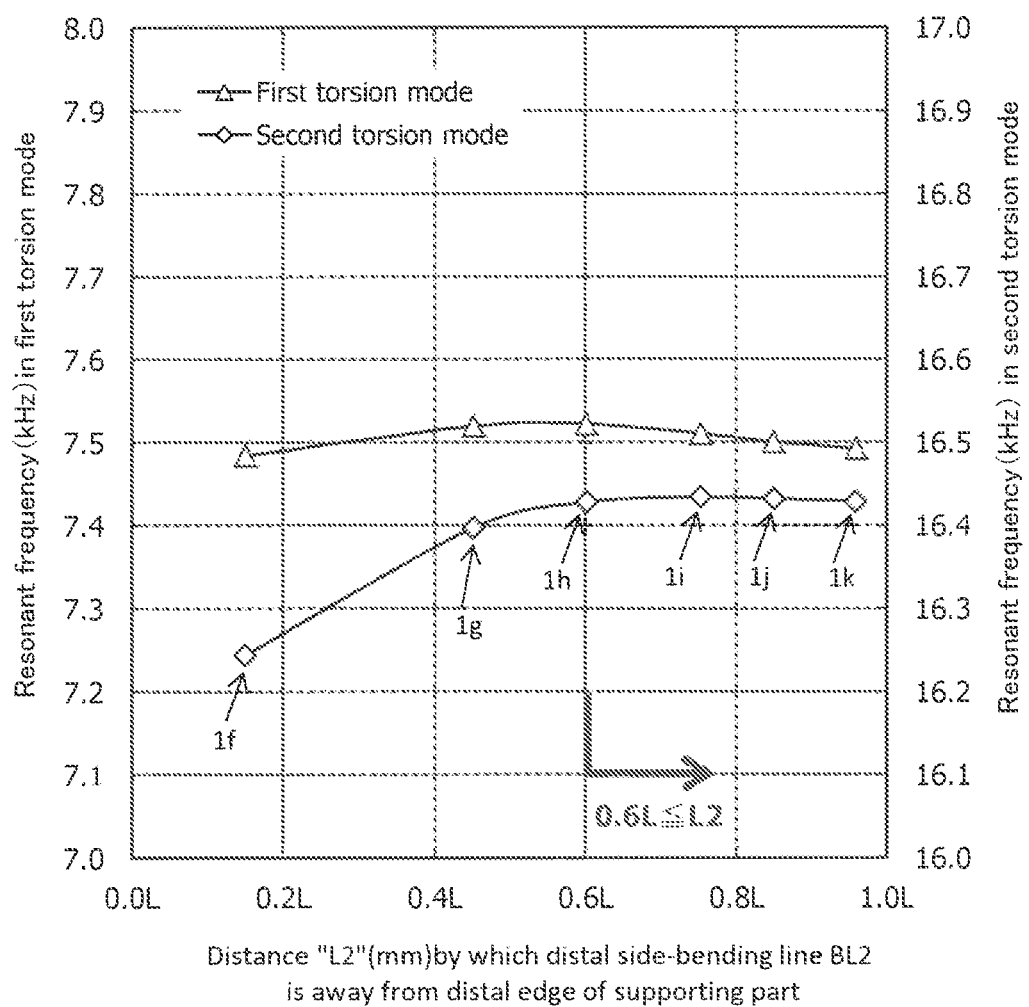
FIG. 7 is a graph showing a result of an analysis regarding a relationship between a position of a distal side-bending line and the resonant frequencies in the first and second torsion modes.
Figure 8:
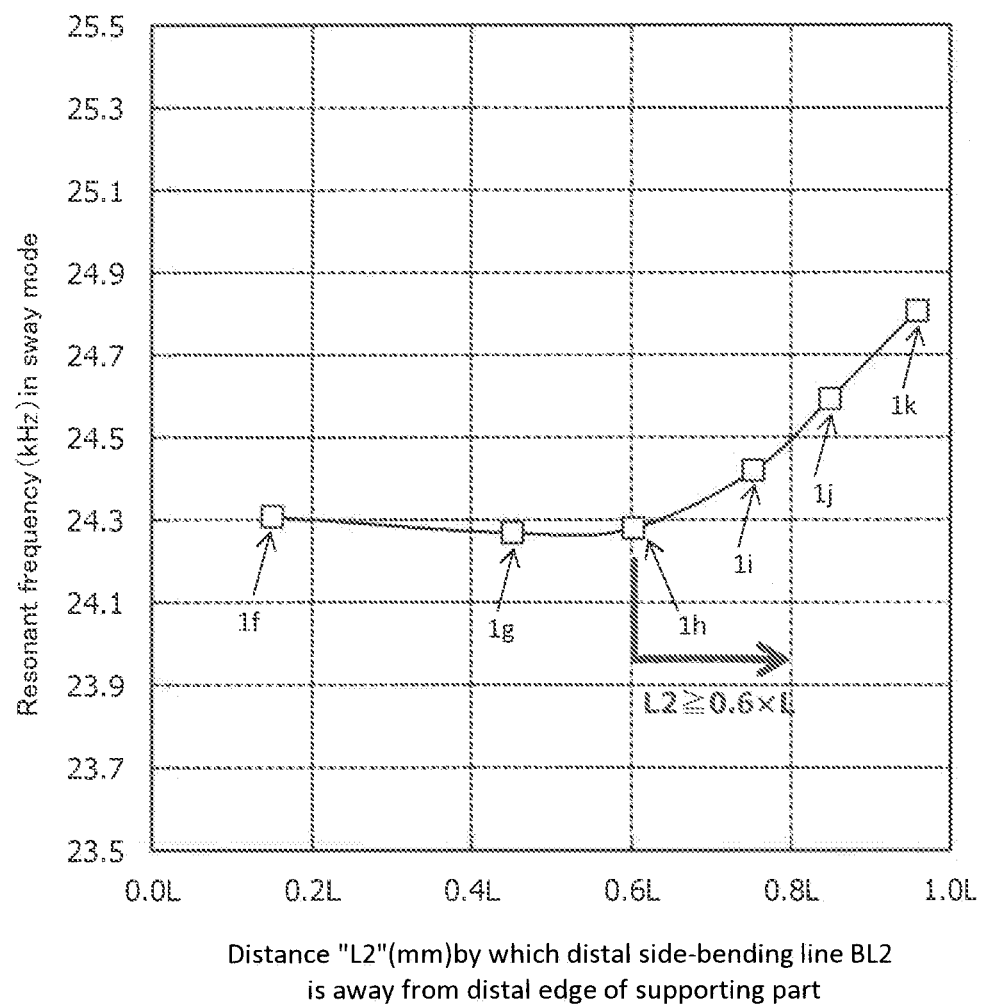
FIG. 8 is a graph showing a result of an analysis regarding a relationship between the position of the distal side-bending line and the resonant frequency in the sway mode.

FIGS. 7 and 8 show the result.

It can be confirmed from FIG. 7 that the resonant frequency in the first torsion mode is substantially constant in spite of the position of the distal side-bending line BL2. On the other hand, it can be confirmed that, assuming that the resonant frequency in the configuration in which the distal side-bending line BL2 is arranged at the same position as the proximal side-bending line BL1 (that is, only one bending line is provided at the leaf spring 21A (the magnetic head suspension 1f)) is a standard frequency, the resonant frequency in the second torsion mode is increased from the standard frequency as the distal-side bending line BL2 is shifted toward the distal side in the suspension longitudinal direction and has a maximum value in the vicinity of L2=0.6*L.

It can be also confirmed from FIG. 8 that a condition of L2≧0.6*L makes it possible to raise the resonant frequency in the sway mode.

The following can be understood from the above.

In the magnetic head suspension 1A in which the load beam part 30 is bent at the load beam part-bending line BL and the leaf spring 21A that forms the load bending part 20 is bent at the proximal side-bending line BL1 and the distal side-bending line BL2, it is possible to effectively reduce the gain of the magnetic head slider 50 at the time when the suspension 1A vibrates in the torsion mode by adjusting the positions of the bending lines BL, BL1, BL2 and the bending angles of the bending portions at the bending lines BL, BL1, BL2. Furthermore, in the suspension 1A, assuming that the length of the leaf spring 21A is represented by the "L", the distance from the distal edge of the supporting part 10 to the proximal side-bending line BL1 is represented by the "L1" and the distance from the distal edge of the supporting part 10 to the distal side-bending line BL2 is represented by the "L2", the condition of L1≦0.3*L (in a more preferable case, L1≦0.15*L) and L2≧0.6*L makes it possible to raise the resonant frequency in the sway mode while preventing the reduction of the resonant frequency in the torsion mode.

Furthermore, the inventor of the present application made a hypothesis that a relative ratio of the bending angle "θ1" of the proximal side-bending portion and the bending angle "θ2" of the distal side-bending portion has some kind of relationship with the resonant frequency in the sway mode, and performed the following third analysis on the basis of the finite element method for ascertaining whether the hypothesis is true.

For the third analysis, prepared were plural magnetic head suspensions 1m to 1q in which the bending angle "θ2" of the distal side-bending portion was set to 1.0 degree, 3.0 degrees, 5.0 degrees, 7.0 degrees and 9.0 degrees, respectively, while having the above-mentioned key dimensions and satisfying the condition of L1=0.15*L (=0.1 mm) and L2=0.85*L (=0.56 mm).

In each of the magnetic head suspensions 1m to 1q, the bending angel "θ1" of the proximal side-bending portion was adjusted so that the pressing load defined by the sum of the load generated by the distal side- bending portion and the load generated by the proximal side-bending portion was 2.5 gf in a state where the setting distance "ZH" (see FIG. 2) was 0.57 mm.

Both the proximal side-bending portion at the proximal side-bending line BL1 and the distal side-bending portion at the distal side-bending line BL2 were bent in such a direction as to cause the distal side of the suspension to come closer the disk surface.

In the plural magnetic head suspensions 1m to 1q, the bending angle "θ1" was 7.9 degrees, 6.1 degrees, 4.3 degrees, 2.4 degrees and 0.6 degree, respectively, so that the relative ratio "θ2/θ1" was 0.13, 0.49, 1.18, 2.88 and 14.7, respectively.

In each of the magnetic head suspensions 1m to 1q, obtained was the resonant frequency in the sway mode on the basis of the finite element method.

Figure 9:
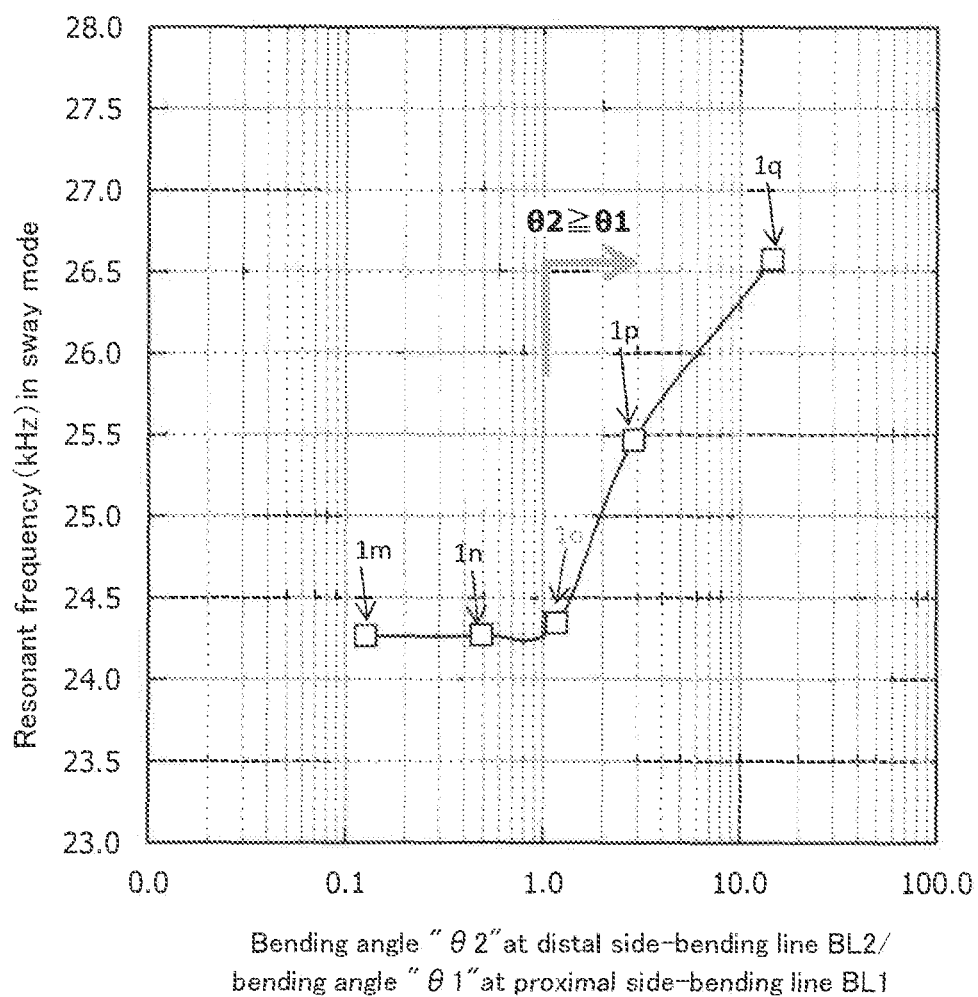
FIG. 9 is a graph showing a result of an analysis regarding a relationship of a relative ratio between the positions of the proximal side-bending line and the distal side-bending line with respect to the resonant frequency in the sway mode.

FIG. 9 shows the result.

It can be confirmed from FIG. 9 that the resonant frequency in the sway mode can be effectively raised if the bending angle "θ2" of the distal side-bending portion was made greater than the bending angle "θ1" of the proximal side-bending portion.

Figure 10A:
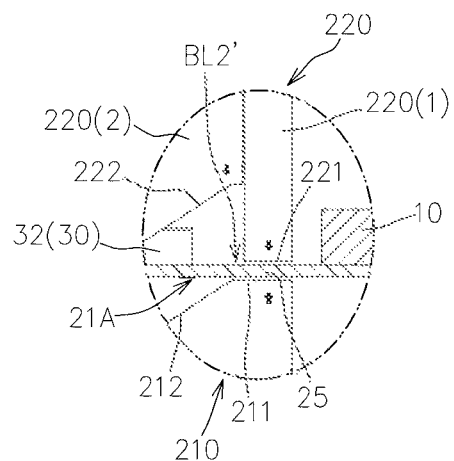
FIGS. 10A to 10D are flow chart diagrams of a manufacturing method of the magnetic head suspension according to the first embodiment.
Figure 10B:
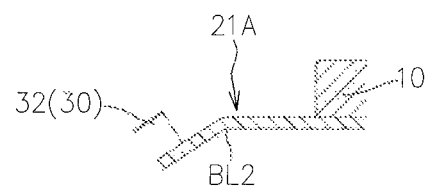
Figure 10C:
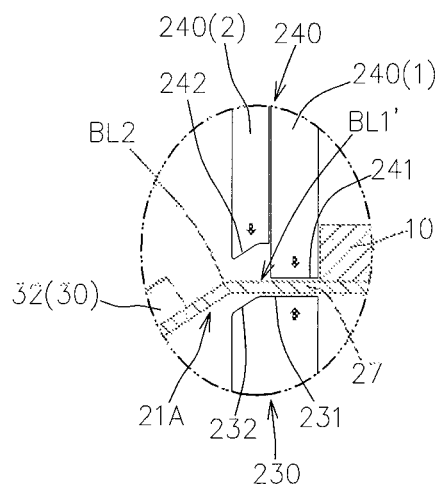
Figure 10D:
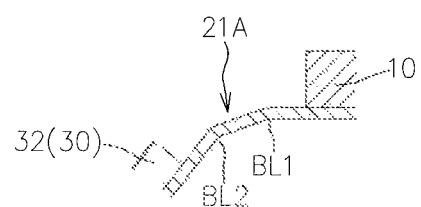

The magnetic head suspension 1A according to the present embodiment in which the leaf spring 21A is provided with the two bending portions including the proximal side-bending portion and the distal side-bending portion is preferably manufactured by a method including a distal side-bending step (see FIG. 10A) and a proximal side-bending step (see FIG. 10C). At the distal side-bending step, a region of the leaf spring 21A that is positioned on a proximal side of a position BL2', which corresponds to the distal side-bending line BL2, is sandwiched to function as a distal side-standard region 25, and, in this state, a region of the leaf spring 21A that is positioned on a distal side of the position BL2' is then bent with respect to the distal side-standard region 25 by a predetermined angle to form the distal side-bending portion. At the proximal side-bending step, a region of the leaf spring 21A that is positioned on a proximal side of a position BL1', which corresponds to the proximal side-bending line BL1, is sandwiched to function as a proximal side-standard region 27, and, in this state, a region of the leaf spring 21A that is positioned on a distal side of the position BL1' and is also positioned on a proximal side of the distal side-bending line BL2 is then bent with respect to the proximal side-standard region 27 by a predetermined angle to form the proximal side-bending portion.

The thus configured manufacturing method in which the distal side-bending portion is firstly formed, and the proximal side-bending portion is then formed makes it possible to form the distal side-bending portion while having the distal side-standard region 25 positioned horizontally and also form the proximal side-bending portion while having the proximal side-standard region 27 positioned horizontally.

Accordingly, accuracy of the bending angles of the distal side-bending portion and the proximal side-bending portion can be enhanced.

In a case where the distal side-bending portion is first formed and subsequently the proximal side-bending portion is formed as shown in FIGS. 10A to 10D, an adjustment of the pressing load defined by the sum of the load generated by the distal side-bending portion and the load generated by the proximal side-bending portion is performed by an adjustment of the bending angle of proximal side-bending portion.

In the manufacturing method shown in FIGS. 10A to 10D, the distal side-bending step is performed with a distal side-die 210 and a distal side-punch 220 that face to each other while sandwiching the leaf spring 21A.

The distal side-die 210 integrally includes a distal side-horizontal surface 211 and a distal side-inclined surface 212. The distal side-horizontal surface 211 corresponds to the distal side-standard region 25. The distal side-inclined surface 212 is positioned on a distal side of the horizontal surface 211 and inclined with respect to the horizontal surface 211 by the predetermined angle.

The distal side-punch 220 includes a distal side-first punch 220(1) and a distal side-second punch 220(2). The distal side-first punch 220(1) includes a distal side-horizontal pressing surface 221 that sandwiches the distal side-standard region 25 in cooperation with the distal side-horizontal surface 211. The distal side-second punch 220(2) includes a distal side-inclined pressing surface 222 that sandwiches the region of the leaf spring 21A, which is positioned on the distal side of the distal side-bending line BL2, in cooperation with the distal side-inclined surface 212.

It is of course possible that a member including the distal side-horizontal surface 211 is separate from a member including the distal side-inclined surface 212.

In the manufacturing method shown in FIGS. 10A to 10D, the proximal side-bending step is performed with a proximal side-die 230 and a proximal side-punch 240 that face to each other while sandwiching the leaf spring 21A.

The proximal side-die 230 integrally includes a proximal side-horizontal surface 231 and a proximal side-inclined surface 232. The proximal side-horizontal surface 231 corresponds to the proximal side-standard region 27. The proximal side-inclined surface 232 is positioned on a distal side of the horizontal surface 231 and inclined with respect to the horizontal surface 231 by the predetermined angle.

The proximal side-punch 240 includes a proximal side-first punch 240(1) and a proximal side-second punch 240(2). The proximal side-first punch 240(1) includes a proximal side-horizontal pressing surface 241 that sandwiches the proximal side-standard region 27 in cooperation with the proximal side-horizontal surface 231. The proximal side-second punch 240(2) includes a distal side-inclined pressing surface 242 that sandwiches the region of the leaf spring 21A, which is positioned on the distal side of the proximal side-bending line BL1 and is also positioned on the proximal side of the distal side-bending line BL2, in cooperation with the proximal side-inclined surface 232.

It is of course possible that a member including the proximal side-horizontal surface 231 is separate from a member including the proximal side-inclined surface 232.

Second Embodiment

Another embodiment of the magnetic head suspension according to the present invention will now be explained.

Figure 11:
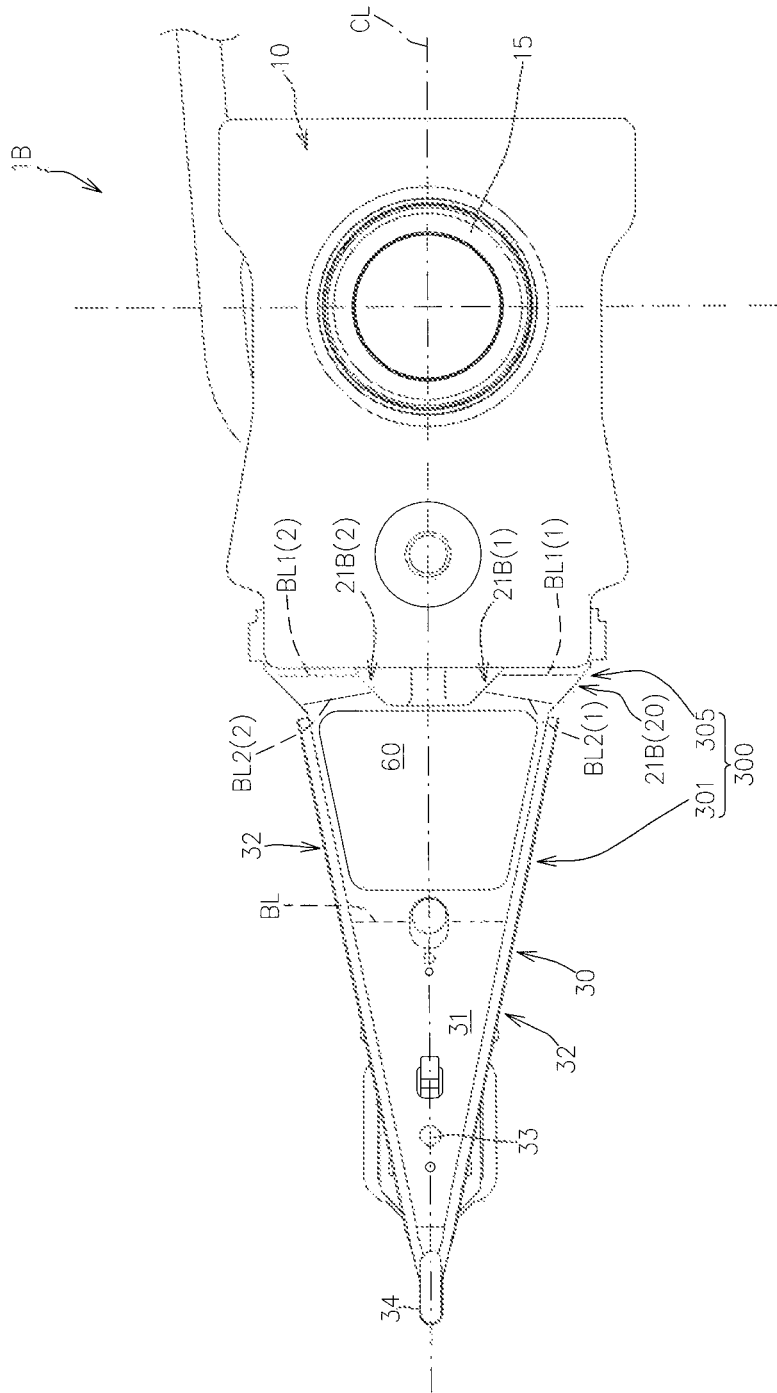
FIG. 11 is a top view of a magnetic head suspension according to a second embodiment of the present invention.

FIG. 11 is a top view (a plan view illustrated from a side opposite from the disk surface) of a magnetic head suspension 1B according to the present embodiment. In the figure, the components same as those in the first embodiment are denoted by the same reference numerals to omit the detailed description thereof The magnetic head suspension 1B is different from the magnetic head suspension 1A only in that the direction of the distal side-bending line BL2 in a plan view is changed.

More specifically, the magnetic head suspension 1B according to the present embodiment includes a leaf spring 21B in place of the leaf spring 21A in comparison with the magnetic head suspension 1A according to the first embodiment.

In the leaf spring 21A in the magnetic head suspension 1A according to the first embodiment, both the proximal side-bending line BL1 and the distal side-bending line BL2 are along the suspension width direction as shown in FIGS. 1 and 3.

On the other hand, in the leaf spring 21B in the magnetic head suspension 1B according to the present embodiment, the proximal side-bending line BL1 is along the suspension width direction while the distal side-bending line BL2 is inclined with respect to the suspension width direction as shown in FIG. 11.

More specifically, in the same manner as the leaf spring 21A in the first embodiment, the leaf spring 21B includes paired first and second leaf spring portions 21B(1), 21B(2) that are arranged on both sides in the suspension width direction with having a space between them in the suspension width direction and are symmetrical to each other in a plan view with the suspension lengthwise center line CL as a reference.

As explained above, the proximal side-bending line BL1 is along the suspension width direction.

In the present embodiment in which the leaf spring 21B includes the paired first and second leaf spring portions 21B(1), 21B(2), the proximal side-bending line BL1 includes a first proximal side-bending line BL1(1) provided at a the first leaf spring portion 21B(1) so as to be along the suspension width direction, and a second proximal side-bending line BL1(2) provided at the second leaf spring portion 21B(2) so as to be symmetrical to the first proximal side-bending line BL1(1) in a plan view with the suspension lengthwise center line CL as a reference.

On the other hand, as shown in FIG. 11, the distal side-bending line BL2 includes a first distal side-bending line BL2(1) provided at the first leaf spring portion 21B(l) so as to be inclined with respect to the suspension width direction, and a second distal side-bending line BL2(2) provided at the second leaf spring portion 21B(2) so as to be symmetrical to the first distal side-bending line BL2(1) in a plan view with the suspension lengthwise center line CL as a reference.

Bending around the first and second distal side-bending lines BL2(1), BL2(2), which are inclined to the suspension width direction and are symmetric to each other with the center line CL as a reference, causes the proximal side of the main body portion 31 of the load beam part 30 to have a shape that is convex in the z direction orthogonal to the disk surface.

Accordingly, the present embodiment can enhance a rigidity in the seek direction as well as a rigidity around the torsion center line along the suspension lengthwise center line CL of the main body portion 31 of the load beam part 30 to raise the resonant frequencies in the sway mode and the torsion mode while obtaining the same effect as the first embodiment.

In the present embodiment, as shown in FIG. 11, the first and second distal side-bending lines BL2(1), BL2(2) are inclined so as to be positioned on a distal side in the suspension lengthwise direction as it goes from an inner side to an outer side in the suspension width direction.

The pressing load is defined by the sum of the load generated by the proximal side-bending portion at the proximal side-bending line BL1 and the distal side-bending portion at the distal side-bending line BL2.

The bending angle of the proximal side-bending portion at the proximal side-bending line BL1 is relatively easy to be adjusted since the proximal side-being line BL1 (the first and second proximal side-bending lines BL1(1), BL1(2)) are along the suspension width direction.

Accordingly, an adjustment of the pressing load to the predetermined value can be exactly performed by adjusting the bending angle of the proximal side-bending line BL1 (the first and second proximal side-bending lines BL1(1), BL1(2)) along the suspension width direction.

Third Embodiment

Still another embodiment of the magnetic head suspension according to the present invention will now be explained.

Figure 12:
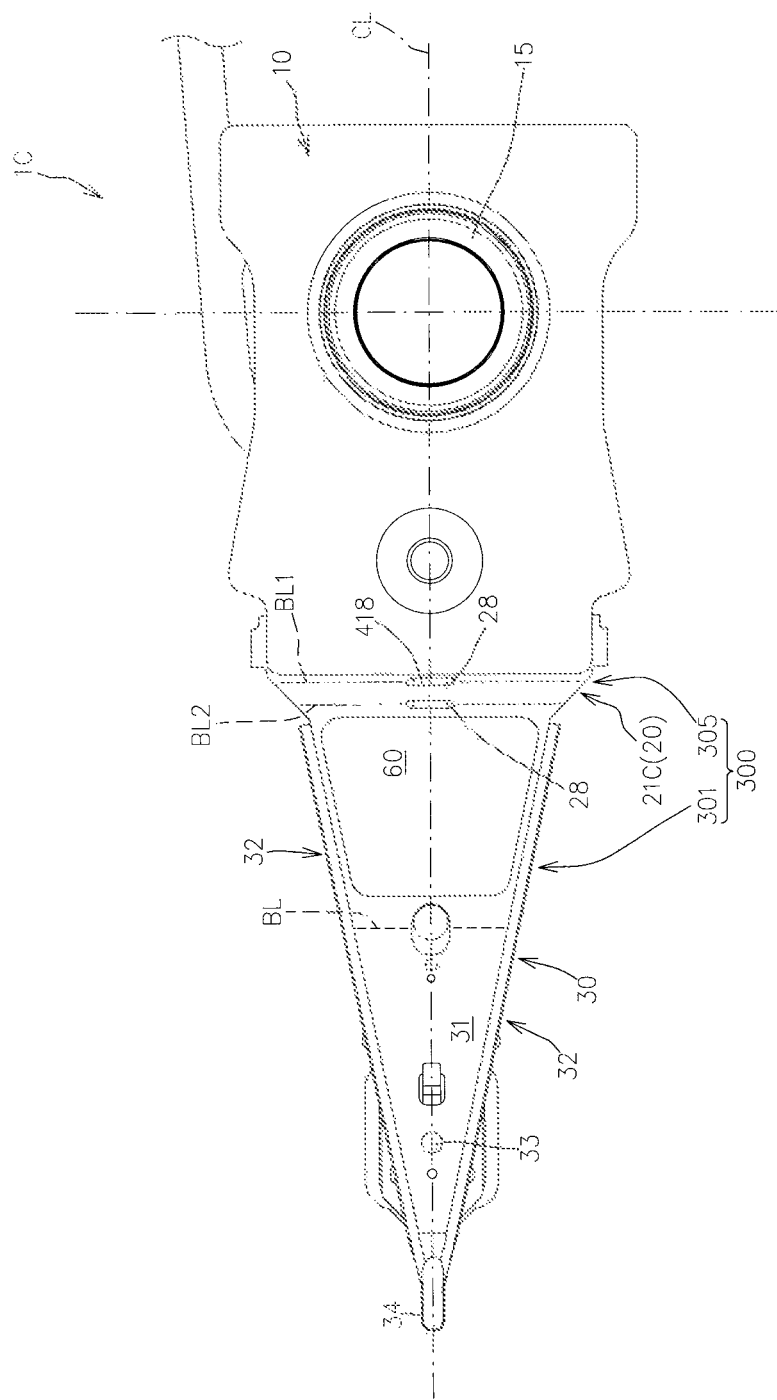
FIG. 12 is a top view of a magnetic head suspension according to a third embodiment of the present invention.

FIG. 12 is a top view (a plan view illustrated from a side opposite from the disk surface) of a magnetic head suspension 1C according to the present embodiment. In the figure, the components same as those in the first and second embodiments are denoted by the same reference numerals to omit the detailed description thereof.

The magnetic head suspension 1C according to the present embodiment is different from the magnetic head suspensions 1A, 1B according to the first and second embodiments in that the leaf spring 21A or the leaf spring 21B is replaced with a leaf spring 21C.

As explained earlier, in the magnetic head suspension 1A (1B), the leaf spring 21A (21B) includes the paired first and second leaf spring portions 21A(1), 21A(2) (21B(1), 21B(2)).

On the other hand, in the magnetic head suspension 1C, the leaf spring 21C is formed by a single plate-like member that extends from the distal edge of the supporting part 10 to the proximal edge of the main body portion 31 of the load beam part 30 over a whole region in the suspension width direction, as shown in FIG. 12.

As shown in FIG. 12, the leaf spring 21C formed by the single plate-like member is provided with openings 28. One opening 28 is arranged at a region with which the load bending part corresponding region 418 (see FIG. 3) is overlapped and on which the proximal side-bending line BL1 is positioned. The other one opening 28 is arranged at a region with which the load bending part corresponding region 418 (see FIG. 3) is overlapped and on which the distal side-bending line BL2 is positioned.

The thus configured magnetic head suspension 1C can realize the following effect while realizing the same effect as the first embodiment.

More specifically, the leaf spring 21C formed by the single plate-like member can enhance a rigidity in the seek direction as well as the torsion direction, in comparison with the leaf spring 21A (21B) including the paired first and second leaf spring portions 21A(1), 21A(2) (21B(1), 21B(2)) that are arranged on the both sides in the suspension width direction while the space being arranged at the center in the suspension width direction. Accordingly, the magnetic head suspension 1C according to the present embodiment can enhance the resonant frequencies in the sway mode and the torsion mode in comparison with the magnetic head suspensions 1A, 1B according to the first and second embodiments.

Furthermore, the openings 28 can facilitate bending processes at the proximal side-bending line BL1 and the distal side-bending line BL2, and also effectively reduce a stress to the flexure base plate 410 due to the bending at the proximal side-bending line BL1 and the distal side-bending line BL2.

What is claimed is:

1. A magnetic head suspension comprising a supporting part that is swung around a swing center in a seek direction parallel to a disk surface directly or indirectly by an actuator, a load bending part including a leaf spring that has a proximal end portion connected to the supporting part and generates a pressing load for pressing a magnetic head slider toward the disk surface, a load beam part that is supported through the leaf spring by the supporting part and transmits the pressing load to the magnetic head slider, and a flexure part that is fixed to the load beam part and the supporting part while supporting the magnetic head slider, wherein the load beam part is bent around a load beam part-bending line that is along a suspension width direction, wherein the leaf spring is bent around a proximal side-bending line and a distal side-bending line that is positioned on a distal side of the proximal side-bending line so that the pressing load is defined by the sum of a load generated by a proximal side-bending portion at the proximal side-bending line and a load generated by a distal side-bending portion at the distal side-bending line, and wherein assuming that a length of the leaf spring in a suspension lengthwise direction that extends from a distal edge of the supporting part to a proximal end portion of the load beam part is represented by "L", a distance in the suspension lengthwise direction from the distal edge of the supporting part to the proximal side-bending line is represented by "L1" and a distance in the suspension lengthwise direction from the distal edge of the supporting part to the distal side-bending line is represented by "L2", a condition of L1≦0.3*L and 0.6*L≦L2 is satisfied.

2. A magnetic head suspension according to claim 1, wherein a condition of L1≦0.15*L is satisfied.

3. A magnetic head suspension according to claim 1, wherein both the proximal side-bending portion and the distal side-bending portion are formed into a shape that is convex toward a direction opposite from the disk surface so that a distal side of the suspension comes closer to the disk surface, and wherein a bending angle "θ2" of the distal side-bending portion is greater than a bending angle "θ1" of the proximal side-bending portion.

4. A magnetic head suspension according to claim 1, wherein the leaf spring includes paired first and second leaf spring portions that are arranged on both sides in the suspension width direction while having a space at a center in the suspension width direction and are symmetrical to each other in a plan view with a suspension lengthwise center line as a reference, wherein the proximal side-bending line includes a first proximal side-bending line provided at the first leaf spring portion so as to be along the suspension width direction, and a second proximal side-bending line provided at the second leaf spring portion so as to be symmetrical to the first proximal side-bending line in a plan view with the suspension lengthwise center line as a reference, wherein the distal side-bending line includes a first distal side-bending line provided at the first leaf spring portion so as to be inclined with respect to the suspension width direction, and a second distal side-bending line provided at the second leaf spring portion so as to be symmetrical to the first distal side-bending line in a plan view with the suspension lengthwise center line as a reference.

5. A magnetic head suspension according to claim 4, wherein the first and second distal side-bending lines are inclined so as to be positioned on the distal side in the suspension longitudinal direction as going from an inner side to an outer side in the suspension width direction.

6. A magnetic head suspension according to claim 1, wherein the leaf spring is formed by a single plate-like member that extends from the distal edge of the supporting part to the proximal end portion of the load beam part over a whole region in the suspension width direction, wherein the flexure part includes a flexure base plate that is brought into contact with disk-facing surfaces of the load beam part and the supporting part that face the disk surface and is fixed thereto, wherein the flexure base plate includes a supporting part fixed region that is fixed to the disk-facing surface of the supporting part, a load beam part fixed region that is fixed to the disk-facing surface of the load beam part, and a load bending part corresponding region that extends between supporting part fixed region and the load beam part fixed region while being overlapped with the leaf spring, and wherein the leaf spring is provided with an opening at a region with which the load bending part corresponding region is overlapped and on which the proximal side-bending line is positioned, and another opening at a region with which the load bending part corresponding region is overlapped and on which the distal side-bending line is positioned.

7. A magnetic head suspension according to claim 1, wherein the load beam part includes a plate-like main body portion that faces the disk surface, and paired right and left flange portions that extend from both sides of the main body portion in a suspension width direction toward a direction opposite from the disk surface, and wherein both the sides of the main body portion in the suspension width direction are inclined in a substantially liner manner so as to come closer to a suspension lengthwise center line as they go from proximal ends toward distal ends in the suspension lengthwise direction.

8. A manufacturing method of a magnetic head suspension according to claim 1, including a distal side-bending step in which a region of the leaf spring that is positioned on a proximal side of a position, which corresponds to the distal side-bending line, is sandwiched to function as a distal side-standard region, and, in this state, a region of the leaf spring that is positioned on a distal side of the position corresponding to the distal side-bending line is then bent with respect to the distal side-standard region by a predetermined angle to form the distal side-bending portion, and a proximal side-bending step in which a region of the leaf spring that is positioned on a proximal side of a position, which corresponds to the proximal side-bending line, is sandwiched to function as a proximal side-standard region, and, in this state, a region of the leaf spring that is positioned on a distal side of the position corresponding to the proximal side-bending line while being positioned on a proximal side of the distal side-bending line is then bent with respect to the proximal side-standard region by a predetermined angle to form the proximal side-bending portion.

* * * * *